United States Patent Office 3,158,174
Patented Nov. 24, 1964

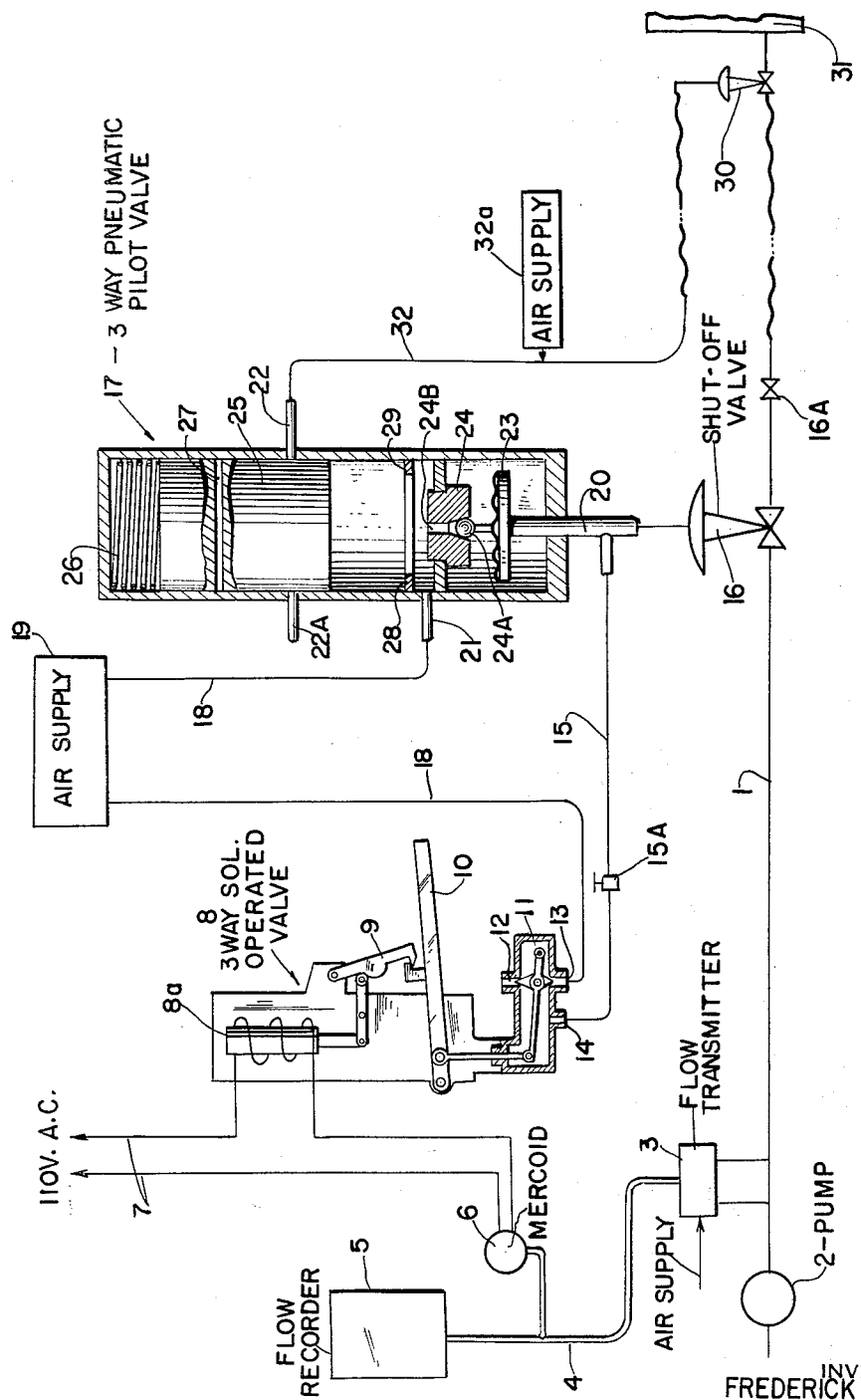

3,158,174
SAFETY SHUT OFF FOR FLUID LOADING
Frederick I. Stalnecker and William O. Suydam, both of Lake Charles, La., assignors to Cities Service Oil Company, Tulsa, Okla., a corporation of Delaware
Filed June 20, 1961, Ser. No. 118,403
1 Claim. (Cl. 137—460)

This invention relates to a safety system designed to be incorporated into a fluids transfer system and more particularly this invention relates to an automatic system for shutting off fluid transmission in the transfer system in the event of line rupture or breakage.

In the transfer of fluids from one point to another, it is often desirable to use flexible pipelines for at least a portion of the transfer line, usually in the instance where delivery is being made to a mobile unit such as a railroad tank car, marine vessel or tank truck. The use of such flexible lines, however, entails considerable risk of product loss through line rupture and cleavage occasioned by over pressure, fatigue or collision of the loaded unit with others in the immediate area. This situation is particularly hazardous when combustible liquids are being transferred.

There is a need, therefore, for an automatic monitoring system which may be employed to shut off fluid transmission in the event of line rupture. The object of this invention is to provide a system associated with fluid transmission apparatus using flexible fluid lines which will shut off fluid flow in the event of line breakage. Other objects will become apparent hereinafter.

In accordance with this invention, briefly, a flow transmitter is attached to the fluids transfer line to be protected. The flow transmitter is adapted to control a 3-way, solenoid operated valve which in turn controls a pneumatic pilot valve. The operation of the pilot valve shuts off fluid flow in the transfer line.

Describing the invention more specifically, a flow rate senser such as a pneumatic output flow transmitter is attached to the fluids transfer line. The output of this meter runs to a flow rate recorder and a mercoid—a Bourdon tube element having an electrical contact attached to it by a mechanical linkage. The electrical contacts of this mercoid are part of an electrical circuit having a solenoid incorporated therein. This solenoid operates a three way valve through a mechanical linkage. This three way valve is connected to a pneumatically operated, spring-loaded, plunger pilot valve by a closed air pressure system. Included in this closed air pressure system is a shut-off valve positioned at the pumping station. In the base of the pneumatic pilot valve is a bleed orifice which controls the air pressure in the main chamber of the pilot valve. This orifice is opened and closed by an inflatable diaphragm, also included in the closed air pressure system.

Connected to one of the ports in the pneumatic pilot valve is a pneumatic line which runs to a second shut off valve positioned at the delivery station.

In operation, when a rupture in the fluids transfer line occurs, a drop in flow resistance is experienced with a corresponding increase in the flow rate. This increase in flow rate is sensed by the flow transmitter causing an increase in the pneumatic output of this meter. This increase in output pressure is sufficient to operate the mercoid associated with the flow transmitter. The contacts in the mercoid are thus "made," closing the associated electrical circuit. The flow of current in this circuit energizes the electromagnet in the three-way solenoid operated valve, moving this valve to its "open" position.

The opening of the solenoid operated valve allows the air in the closed air pressure system associated therewith to escape to the atmosphere. The drop in the air pressure in this system causes two things to happen: (1) it allows the shut off valve at the pumping station to close, shutting off fluid flow and (2) it allows the diaphragm in the base of the pneumatic pilot valve to deflate.

The deflation of the bleed orifice diaphragm occurs after the closing of the pumping station shut off valve. This is accomplished by setting the deflation pressure of the diaphragm at a value slightly less than the pressure of the shut off valve. For example, if the pumping station shut off valve is completely closed when the air pressure in the system falls to 3 p.s.i., the diaphragm may be set to deflate at 2.5 p.s.i. As the diaphragm deflates, the air pressure in the main chamber of the plunger pilot valve is allowed to leak out to the atmosphere. The plunger is thus allowed to fall to its lowermost position. In this position the pneumatic line connected to a port in the pilot valve is opened and the shut off valve at the delivery station is allowed to close, preventing fluid back flow.

The fluids transfer line is thus closed off at the pump end and at the delivery end. Pumping is discontinued. Once the rupture or leak is repaired, the solenoid operated valve is manually reset. Pressure begins to build up in the associated air pressure system inflating the pneumatic pilot valve diaphragm and forcing the shut off valve at the pumping station open. The inflation of this diaphragm closes the bleed orifice in the base of the pneumatic pilot valve. With the bleed orifice in its closed position, air pressure begins to build up in the main chamber of the pilot valve, forcing the plunger upward to its uppermost position. Once the plunger has reached this position, the air pressure in the pneumatic line connected to one of the ports in the pilot valve is no longer allowed to escape to the atmosphere. As the pressure in this line builds up, the shut off valve at the delivery station is forced open. The transfer line is open and pumping is resumed.

It is a very important aspect of this invention that the shut off valve at the pumping station closes before the shut off valve at the delivery station. This delay is important because if the delivery station valve were to close before the pumping station valve, pressure in the transfer line would be concentrated at the point of rupture or leak and would further rupture the line.

To more fully understand this invention, reference is made to a typical example found in the figure of the drawing in which all equipment is shown in elevation. Fluid is pumped into fluids transfer line 1 by a pump 2. Connected to line 1 is a flow transmitter 3 having a pneumatic output 4. The output line 4 is attached to a flow rate recorder 5 and a mercoid 6. Air pressure for the pneumatic output 4 is derived from any suitable air supply. Associated with mercoid 6 is an electrical circuit 7. Included in electrical circuit 7 is a solenoid 8a which operates a three way solenoid operated valve 8. To one end of solenoid 8a is attached a catch 9 which cams against operating arm 10. Mechanically connected to operating arm 10 is a port closing member 11 associated with ports 12 and 13. During normal operation, port 12 is closed by port closing member 11. Also included in the body of solenoid operated valve 8 is a third port 14.

Port 12 is open to the atmosphere. To port 13 is attached an air pressure line 18. Connected to port 14 is an air pressure line 15 which runs to a pumping station shut off valve 16 attached to fluids transfer line 1. 16A is a check valve. Line 15 is also connected to an inflatable diaphragm 23 in the base of a three way, spring loaded pneumatic pilot valve 17. An adjustable restriction orifice 15A is provided in line 15. Diaphragm 23 controls a bleed orifice 24 in pilot valve 17 by holding ball check 24a in intimate contact with an aperture 24b in bleed orifice 24.

The air pressure line 18 connected to port 13 runs first to a standard air supply 19 and thence to a port 21 in pneumatic pilot valve 17. Inside pilot valve 17 is a spring loaded, pneumatically operated plunger 25. Disposed horizontally through plunger 25 is an aperture 27. Plunger 25 is forced toward its upper position by the air pressure in line 18, provided to pilot valve 17 by port 21. In this position, plunger 25 compresses a spring 26. In its lowermost position, plunger 25 rests on stops 28 and 29.

A second and third port, 22 and 22A are provided in pneumatic pilot valve 17. Port 22A is open to the atmosphere. To port 22 is attached a pneumatic line 32 which controls a shut off valve 30 at the delivery station 31. Air pressure for line 32 may be derived from any standard air supply such as 32a.

In operation, when a rupture in fluids transfer line 1 occurs, an increase in flow rate is experienced due to a drop in resistance to fluid flow. This increase in flow rate is sensed by flow transmitter 3. The air pressure in the pneumatic output 4 of transmitter 3 increases proportionally. The increase in pressure in output 4 is recorded on flow recorder 5 and operates mercoid 6, closing the electrical circuit 7. The flow of current through circuit 7 energizes solenoid 8a in three way solenoid operated valve 8. Solenoid 8a moves up forcing catch 9 out of engagement with operating arm 10. Being no longer supported, operating arm 10 falls to its downward position. This movement of arm 10 moves port-closing member 11 away from port 12 and into contact with port 13.

With port 12 open, the air pressure in line 15 is allowed to slowly bleed through restriction orifice 15a to port 14 to port 12 and out into the atmosphere. The air pressure in line 15 drops, allowing pumping station shut off valve 16 to close and allowing diaphragm 23 to deflate. In its deflated condition diaphragm 23 no longer holds ball check 24a in contact with aperture 24b in bleed orifice 24. The pressure in the upper portion of pneumatic pilot valve 17 now leaks through bleed orifice 24. Plunger 25 can no longer be sustained in its upper position and it moves downward under the action of compressed spring 24 until stopped by stops 28 and 29. When plunger 25 rests on stops 28 and 29, aperture 27 is in alignment with ports 22 and 22A. When aperture 27 is so aligned with ports 22 and 22A, the air pressure in pneumatic line 32 is allowed to leak through port 22 to port 22A and out into the atmosphere.

As the pressure in pneumatic line 32 drops, shut off valve 30 at delivery station 31 is allowed to close. With shut off valves 16 and 30 closed, fluids transfer line 1 may be repaired.

When repairs are complete, operating arm 10 on solenoid operated valve 8 is manually reset. With operating arm 10 in its upper position, port-closing-member 11 is moved out of contact with port 13 and closes port 12. The air in line 15 can no longer escape and pressure builds up, inflating diaphragm 23. When diaphragm 23 is inflated, ball check 24a closes aperture 24b in bleed orifice 24. With bleed orifice 24 closed, pressure from line 18 begins to build up in the upper portion of pneumatic pilot valve 17, forcing plunger 25 toward its upper position compressing spring 26. As plunger 25 proceeds to its upper position, aperture 27 is no longer aligned with ports 22 and 22A. The pressure in pneumatic line 32 can no longer escape to the atmosphere and shut off valve 30 is forced open. As the pressure in line 15 continues to build up, shut off valve 16 opens.

It is to be understood that the system of this invention may be applied to the transfer of any fluid, for example, gasoline, LPG, crude oil, fuel oil, cement, grains, flour, powdered chemicals and the like. If it is desired to transfer a normally gaseous product in a liquified state under pressure, a vapor return line running from the delivery station back to the pumping station would have to be provided to carry off displaced air and vapor from the tank into which such liquid product is run. In this instance, shut off valves for this line would be provided at both the pumping station and the delivery station. These valves would be controlled in the same manner as the shut off valves on the fluids transfer line.

The equipment of the figure was applied to the loading of liquified propane aboard marine vessels. A vapor return line with shut off valves at the pumping station and the delivery station was provided. These valves are operated in the same manner as shut off valves 16 and 30. Normal operating flow rate was set at 100 bbls. per hour. The flow transmitter 3 used had an output of 3 to 15 p.s.i. At the 100 bbls. per hour flow rate this transmitter had an output of 7 p.s.i. A 15 p.s.i. mercoid 6 was used and set to trip at 8 p.s.i. The air pressure lines 15 and 18 associated with the three way solenoid operated valve 8 was connected to a 17 p.s.i. air supply 19. Restriction orifice 15A was set such that 60 seconds were required to completely bleed line 15. The pumping station shut off valve 16 was set to close at 3 p.s.i. while the diaphragm 23 in the pneumatic pilot valve 17 was set to deflate at 2.5 p.s.i. Pressure for the pneumatic line 32 was provided from another 17 p.s.i. source. Delivery station shut off valve 30 was set to close at 3 p.s.i.

When a rupture in the fluids transfer line occurred, the flow rate increased. This increase was sensed by flow transmitter 3. Output 4 began to increase from 7 p.s.i. and at 8 p.s.i. mercoid 6 was tripped, closing circuit 7. Solenoid 8a operated, camming catch 9 out of engagement with operating arm 10. As operating arm 10 fell to its lowermost position, port-closing member 11 was moved out of contact with port 12 and into contact with port 13. The air in line 15 began to bleed through restriction orifice 15A to port 14 and out to the atmosphere through port 12. Restriction orifice 15A was set such that 60 seconds were required to completely bleed line 15. When the pressure in line 15 reached 3 p.s.i., shut off valve 16 was completely closed. At 2.5 p.s.i. diaphragm 23 deflated, allowing ball check 24a to drop out of engagement with aperture 24b. Plunger 25 dropped to its lowermost position. The air in line 32 bled through port 22 through aperture 27 to port 22A where it was vented to the atmosphere. When the pressure in line 32 dropped to 3 p.s.i., shut off valve 30 was completely closed.

After repairs, operating arm 10 was manually reset causing member 11 to close port 12 and open port 13. Pressure in line 15 began to build up and when 2.5 p.s.i. had been reached, diaphragm 23 was completely inflated and ball check 24a was forced into aperture 24, closing bleed orifice 24. With bleed orifice 24 closed, plunger 25 was forced to its uppermost position by the pressure supplied through port 21. With aperture 27 no longer in alignment with ports 22 and 22A, the pressure in line 32 began to build up.

When the pressure in line 15 and line 32 reached 15 p.s.i., shut off valves 16 and 30 were fully open. Pumping was subsequently resumed.

It is obvious that many modifications of and additions to this system are possible and it is to be understood that the spirit and scope of this invention is to be limited only by the scope of the claim appended hereto.

We claim:

A safety system comprising: a fluid transfer line, first biased closed valve means in a first portion of said transfer line, pressure responsive means effective upon application of a first sufficient pressure to open said first valve means, means for supplying said first sufficient pressure to said pressure responsive means, means to reduce said first sufficient pressure by an amount rendering said first pressure responsive means ineffective whereby said biasing means closes said first valve means, said pressure reducing means comprising pressure operated piston valve means biased to open position and held in closed position by a predetermined pressure from a second pressure source, pressure responsive bleed orifice means effective to reduce said predetermined pressure and biased to pressure relieving position, the application of pressure from said second source when acting on said pressure responsive bleed orifice means being sufficient to maintain said bleed orifice biasing means ineffective, second biased closed valve means in a second portion of said transfer line, second pressure responsive means effective upon application of said second sufficient pressure to open said second valve means, means including a supply and exhaust valve to either establish communication between said second pressure source and both said second pressure responsive means and said pressure responsive bleed orifice means or to shut off communication of said second pressure source and vent said second pressure responsive means and said pressure responsive bleed orifice means to atmosphere so as to relieve said second sufficient pressure and bleed orifice sufficient pressure, said supply and exhaust valve means having means for releasably holding said valve means in said communicating position and for releasing to non-communicating position, solenoid means to effect the release of said valve means, means including flow transmitter means and switch means to effect energization of said solenoid to release said valve means upon predetermined excess flow in said fluid transfer line.

References Cited in the file of this patent

UNITED STATES PATENTS 2,072,314    Rhodes  ---------------- Mar. 2, 1937

FOREIGN PATENTS 396,502    Germany  --------------- June 3, 1922